Figure 2:
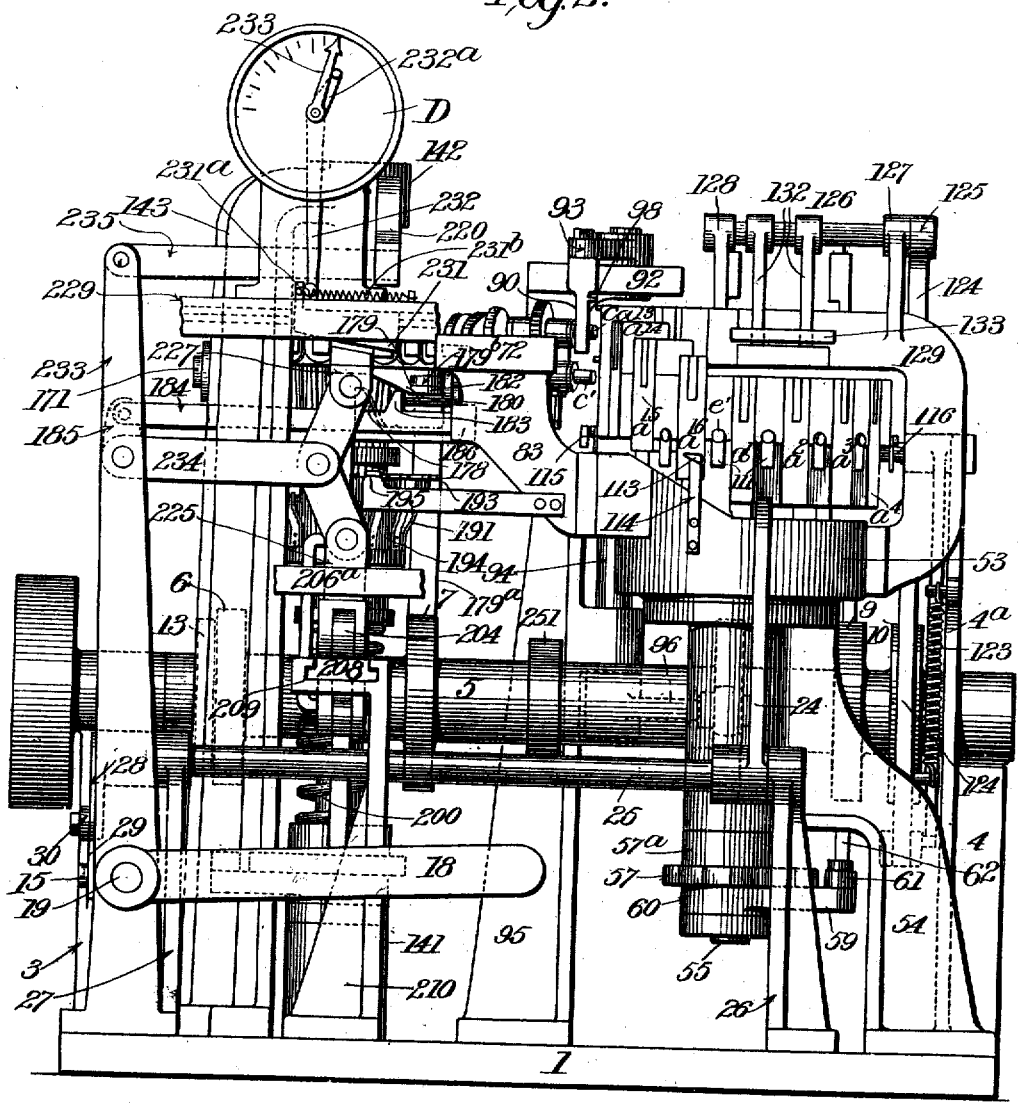

W. T. HOOFNAGLE.
MACHINE FOR FORMING JUSTIFIED LINES OF TYPE.
APPLICATION FILED JULY 15, 1908.
912,961.
Patented Feb. 16, 1909.
10 SHEETS—SHEET 1.
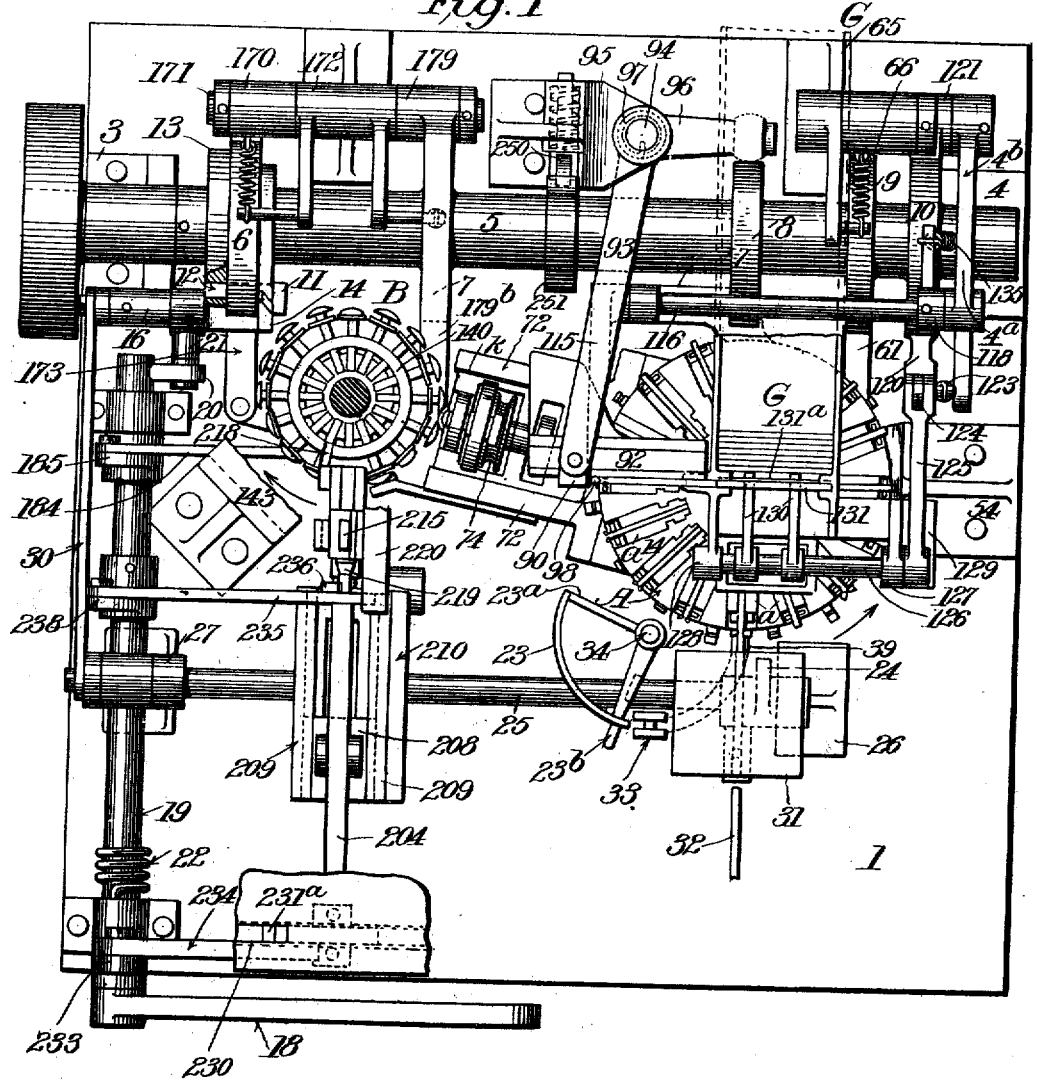
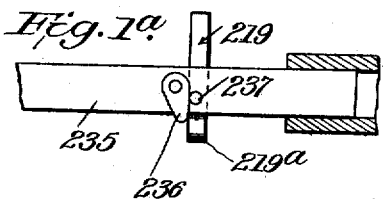

W. T. HOOFNAGLE.
MACHINE FOR FORMING JUSTIFIED LINES OF TYPE.
APPLICATION FILED JULY 15, 1908.

912,961.

Patented Feb. 16, 1909.
10 SHEETS—SHEET 2.

Witnesses
J. G. Finkel
Newton P. Willis

Inventor
W. T. Hoofnagle
by Robert Watson
Attorneys

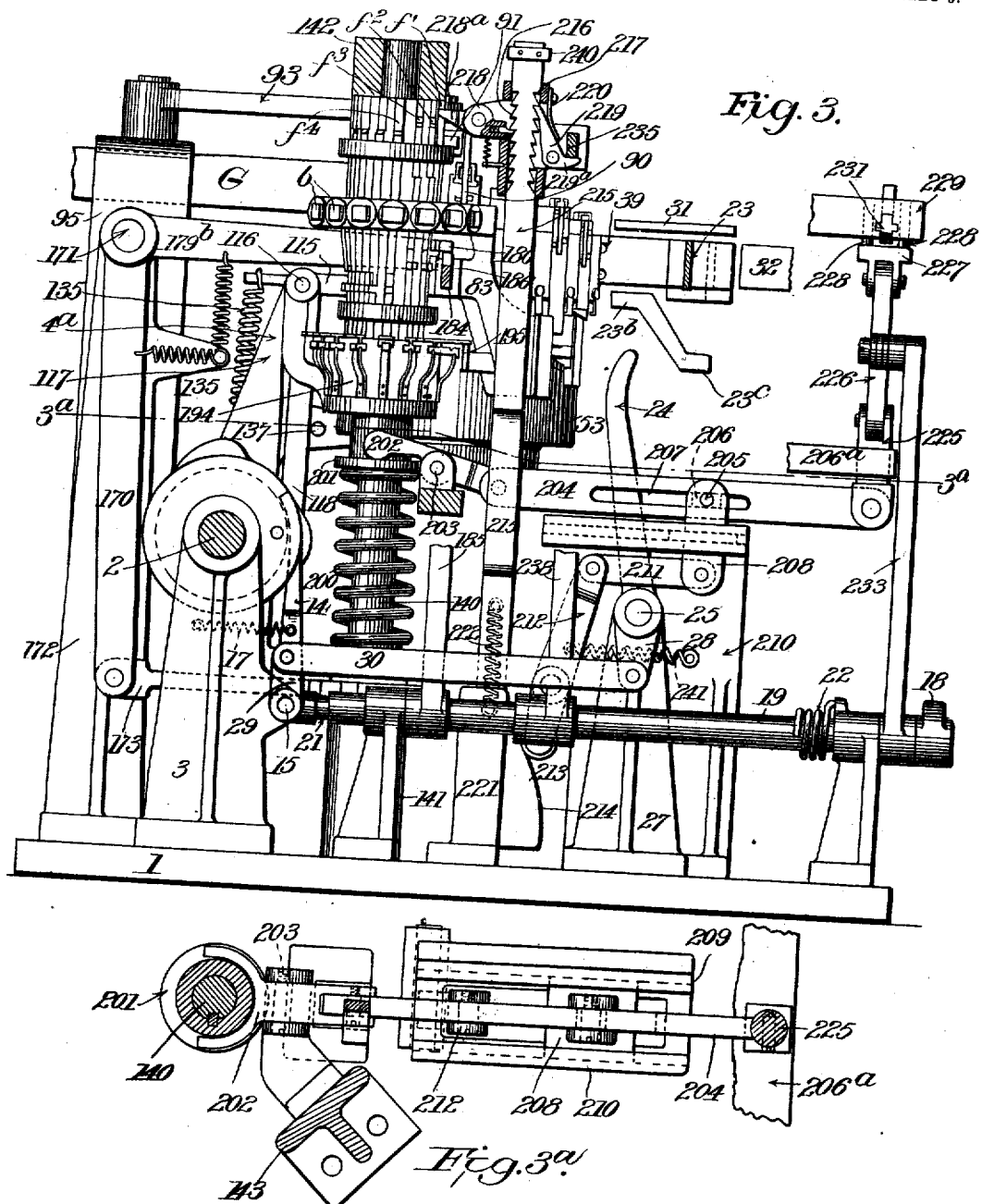

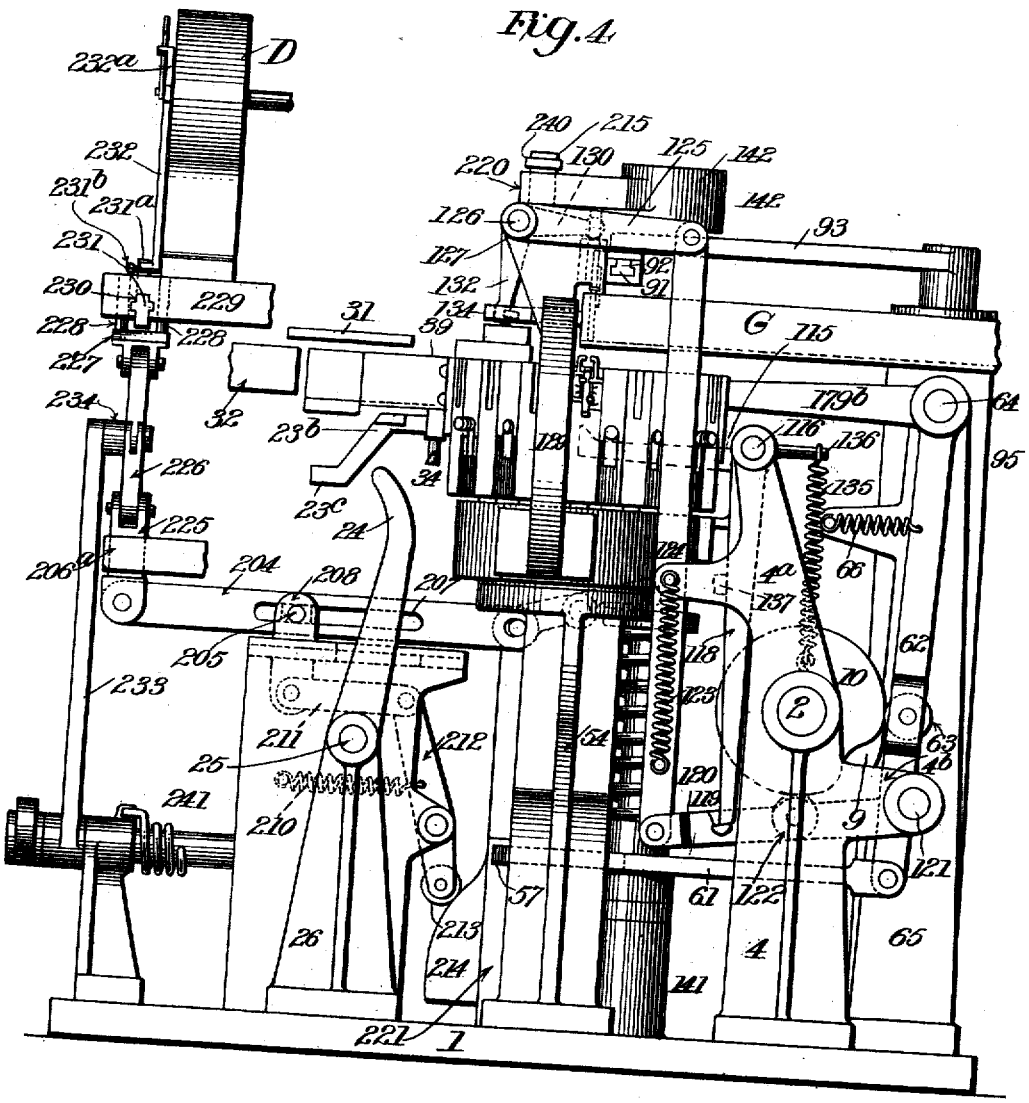

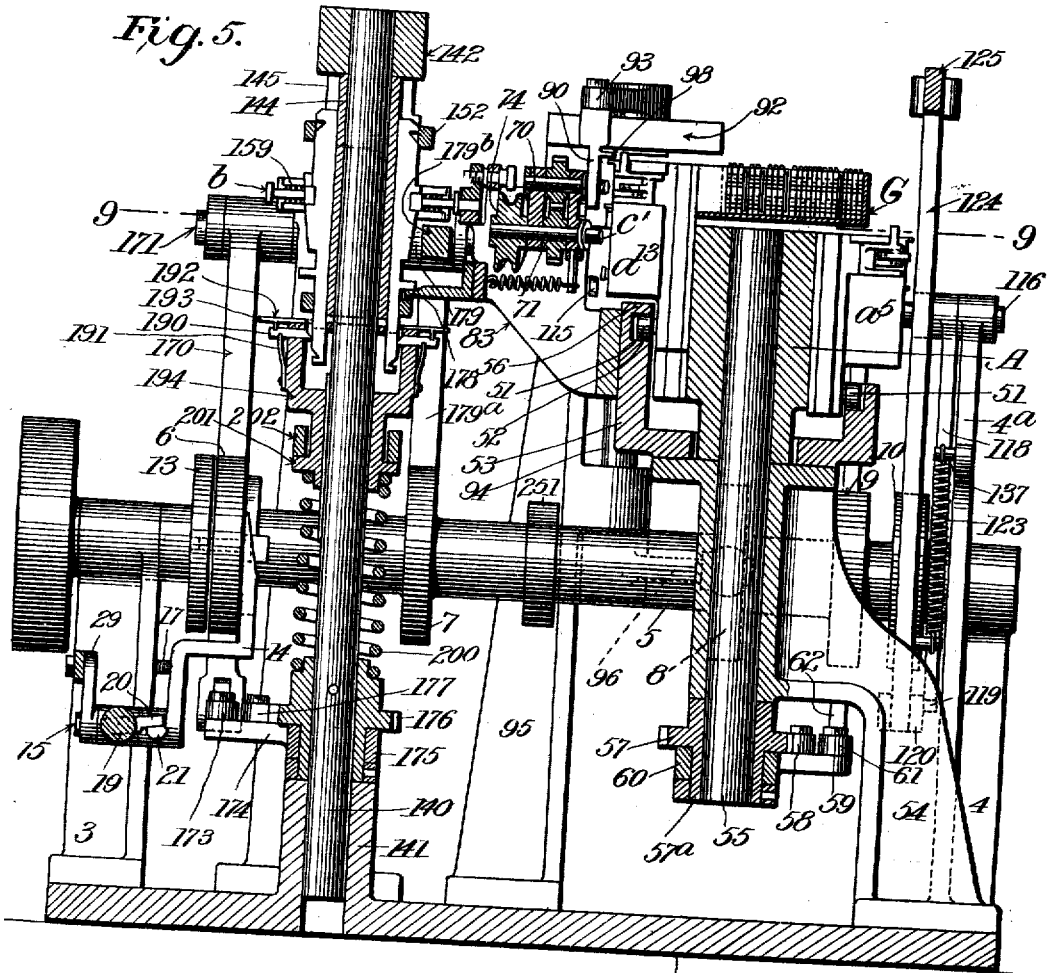

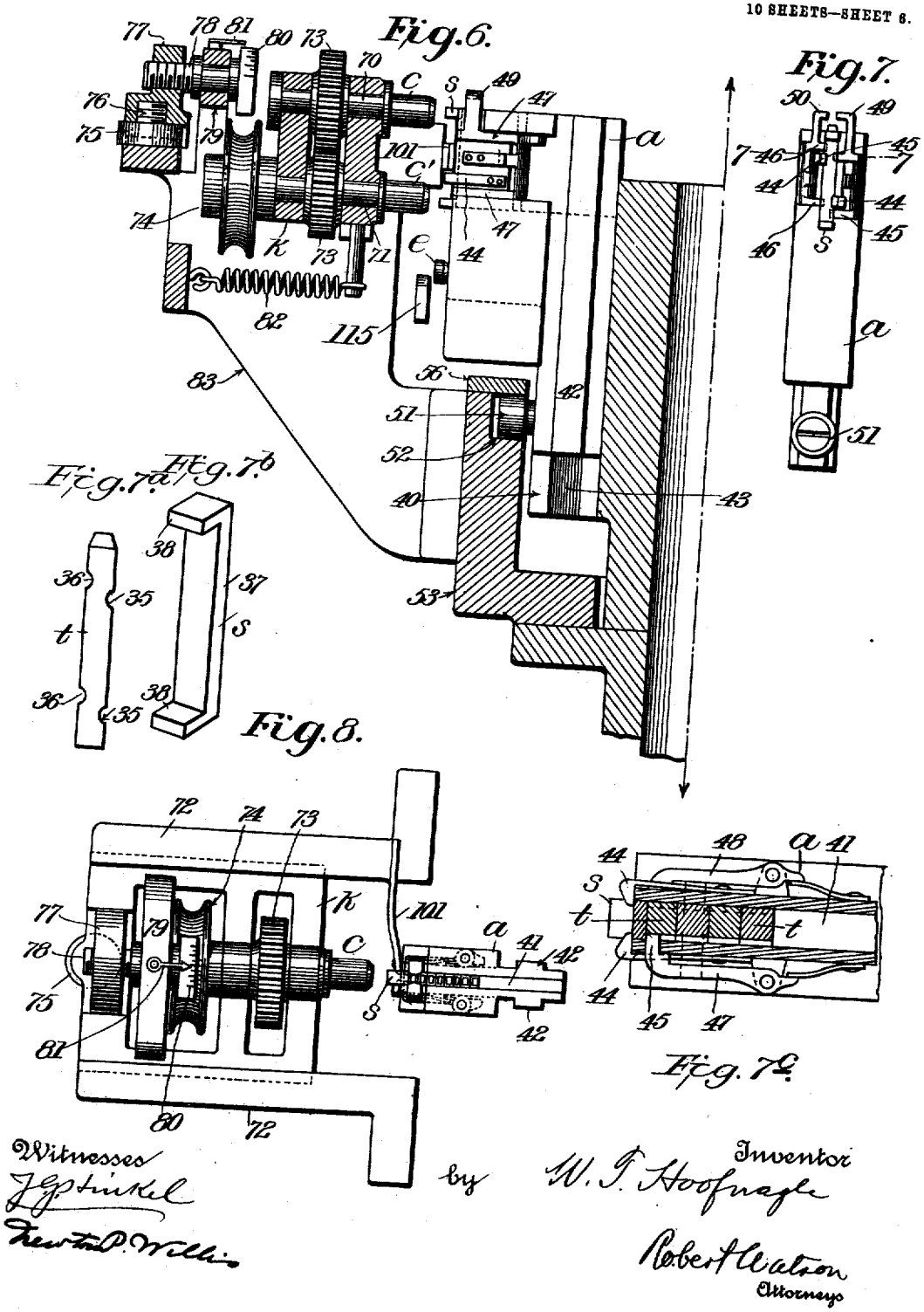

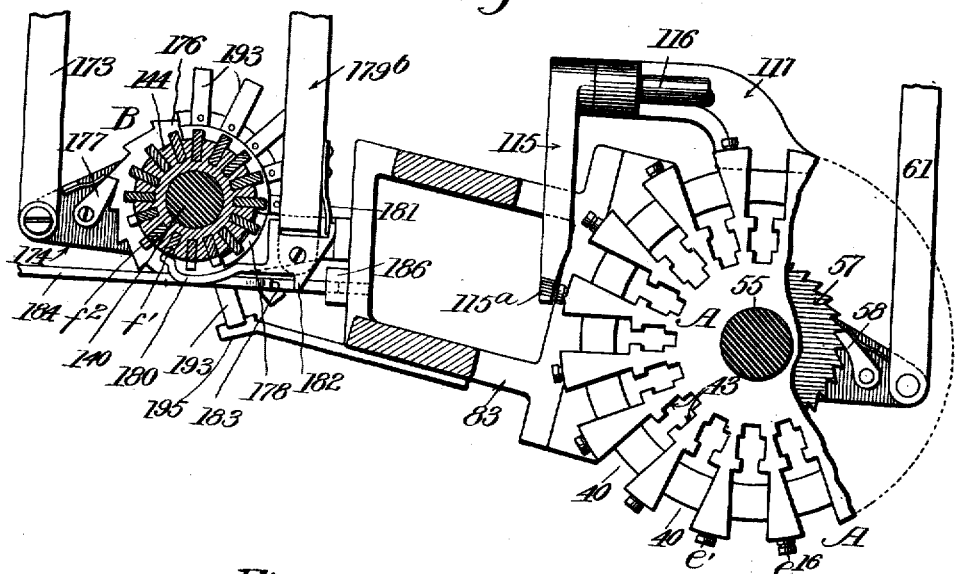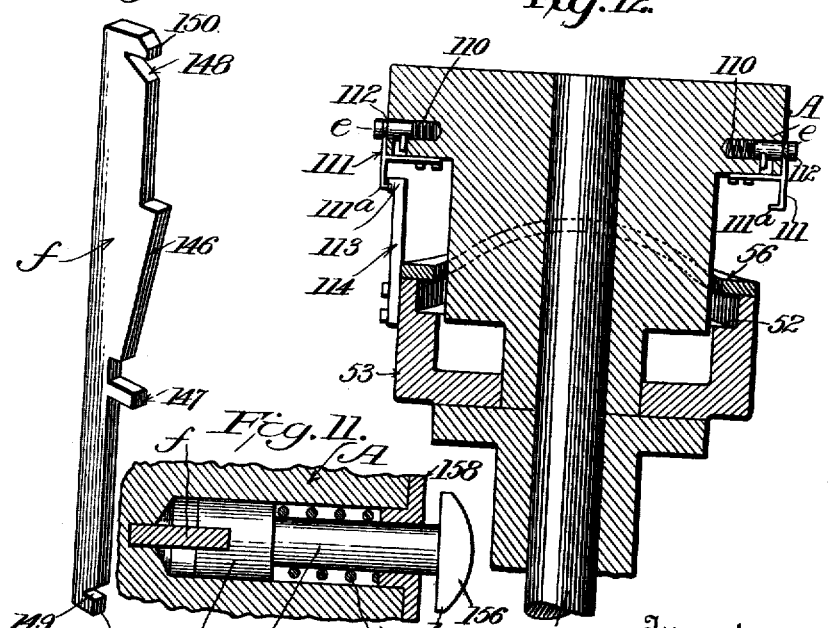

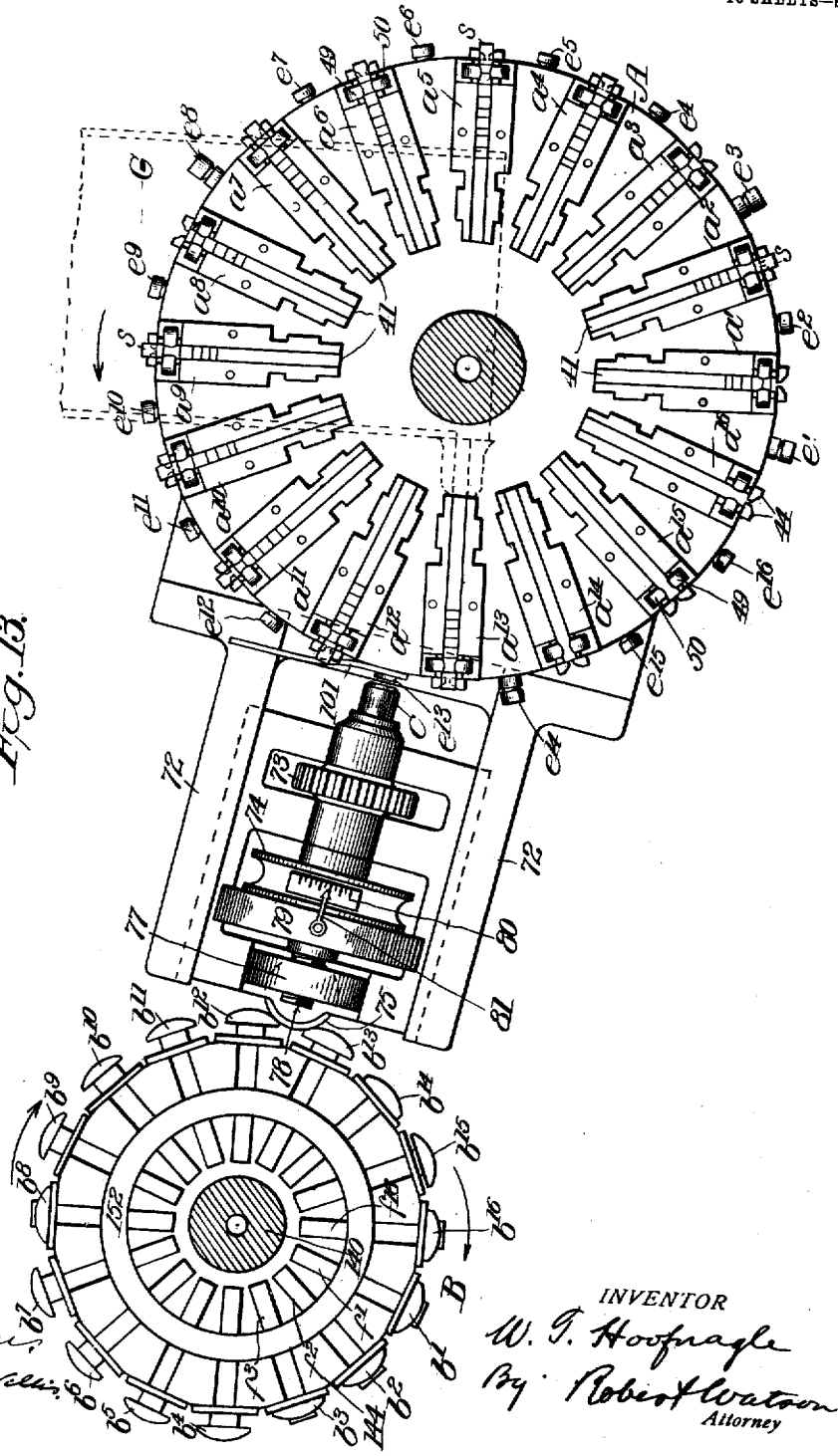

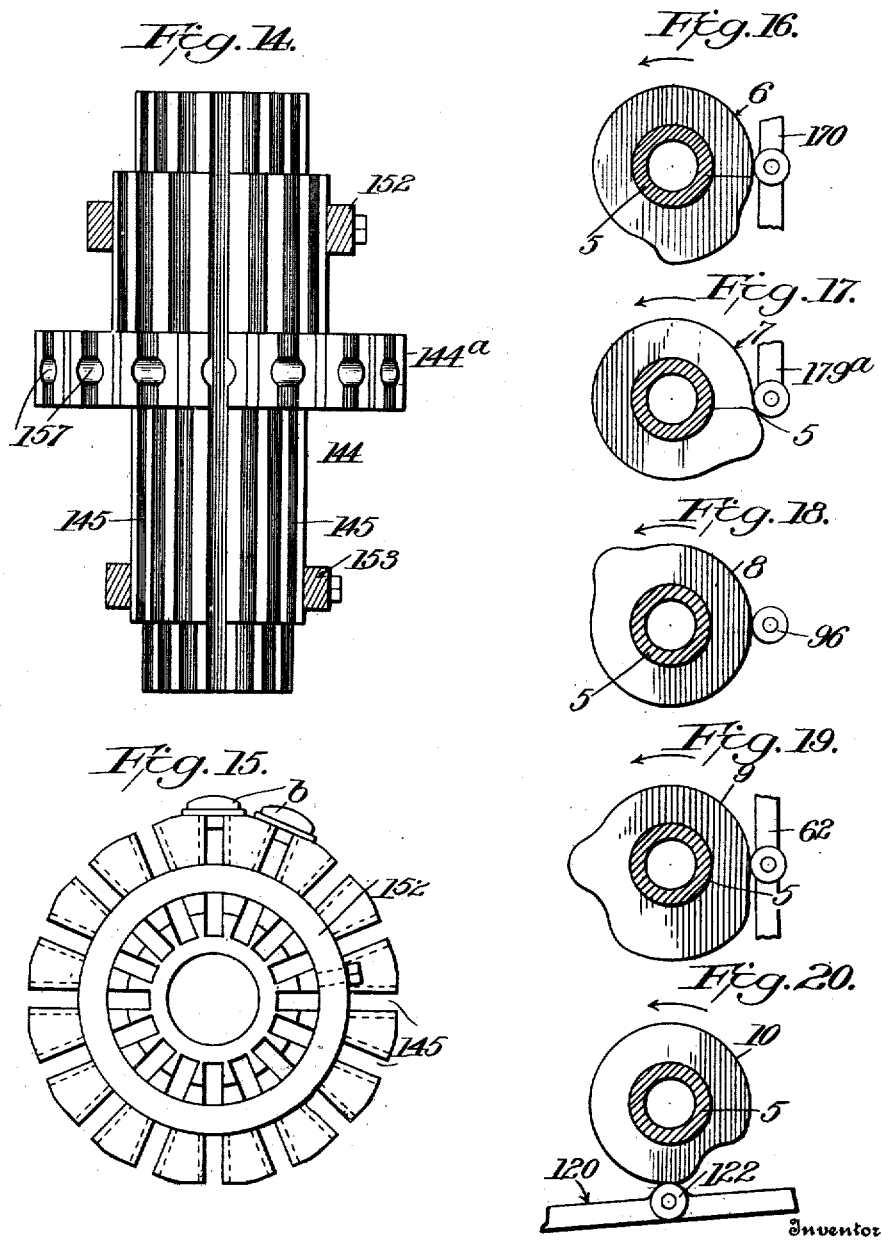

W. T. HOOFNAGLE.
MACHINE FOR FORMING JUSTIFIED LINES OF TYPE.
APPLICATION FILED JULY 15, 1908.
912,961.
Patented Feb. 16, 1909.
10 SHEETS—SHEET 10.
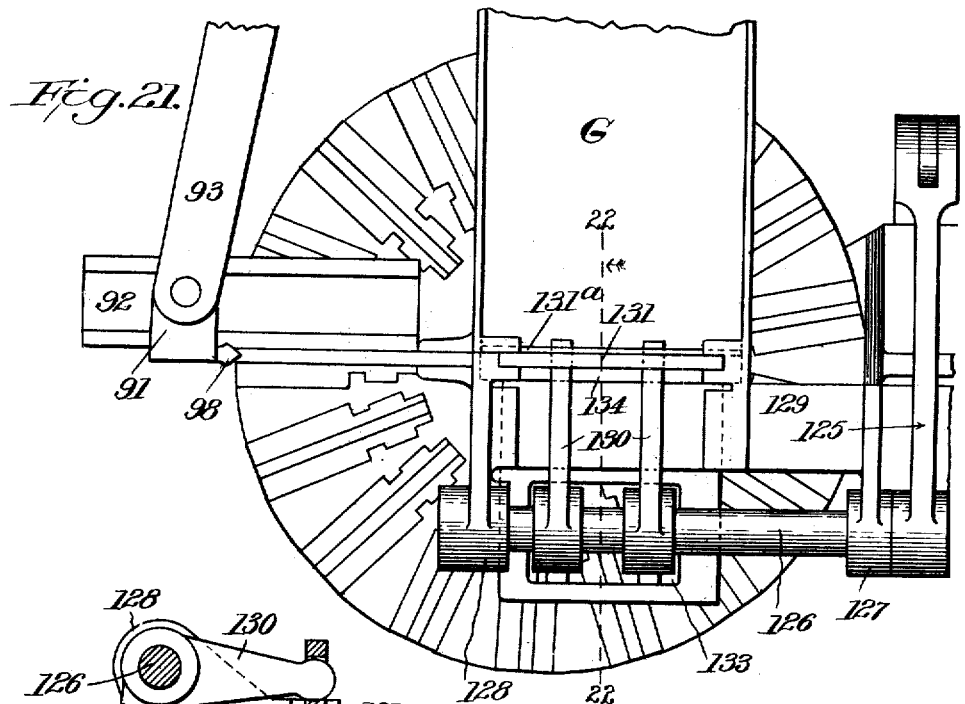
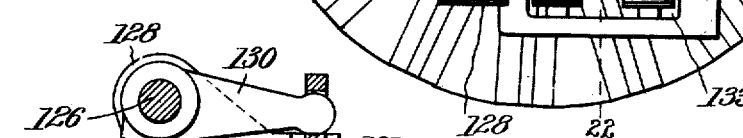
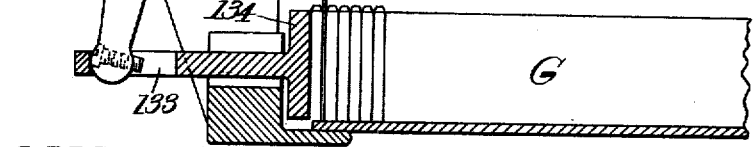
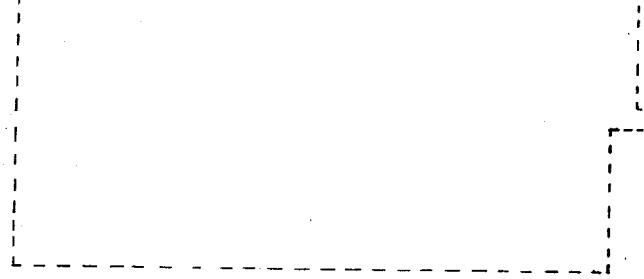
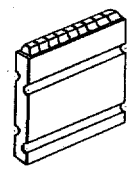
Witnesses
C. H. Walker
Arthur L. Bryant
Inventor
W. T. Hoofnagle
By Robert Watson
Attorney
THE NORRIS PETERS CO., WASHINGTON, D. C.

UNITED STATES PATENT OFFICE.

WILLIAM T. HOOFNAGLE, OF BLOOMFIELD, NEW JERSEY, ASSIGNOR OF ONE-HALF TO MALCOM W. CLEPHANE, OF NEW YORK, N. Y., AND ONE-HALF TO MALVINA S. HOOFNAGLE.

MACHINE FOR FORMING JUSTIFIED LINES OF TYPE.

No. 912,961.

Specification of Letters Patent.

Patented Feb. 16, 1909.

Application filed July 15, 1908. Serial No. 443,613.

*To all whom it may concern:*

Be it known that I, WILLIAM T. HOOFNAGLE, a citizen of the United States, residing at Bloomfield, in the county of Essex and State of New Jersey, have invented certain new and useful Improvements in Machines for Forming Justified Lines of Type, of which the following is a specification.

This invention relates to a machine for forming justified lines of type and it may be used in connection with either a type casting mechanism or a type setting mechanism.

In machines for casting and composing justified lines of type it is usual to first perforate a controller strip by mechanism operated from a key board and then pass this strip backward through a casting machine which casts and assembles the types and spaces composing the line. This strip, co-operating with the mechanism of the casting machine locates a movable die plate over the type mold for forming the various characters in the line and it regulates the width of the mold for casting the justified spaces. When my invention is employed in connection with a type casting apparatus, the controller strip is not required and the die plate may be centered over the mold directly by the operation of the keys of the key-board. The entire operation, therefore, may be performed on a single machine.

As my invention relates only to the mechanism for assembling and justifying lines of type, and may be used in connection with either a type casting apparatus or an apparatus for selecting type from magazines, I have not illustrated in the drawings the details of either a type casting or a type selecting mechanism. For the purpose of illustration I have shown, in connection with the drawings of the machine which forms the subject of my invention only the outline of the die plate of a casting machine and the ejectors for transferring the type and spaces from the molds to the word-holders.

In carrying out my invention I provide a series of word-holders each having a channel adapted to receive the type for one word of a line and having means for holding a justifying space at the entrance of the channel. These holders are moved successively to the delivery point where the type for the words of a line and the justifying spaces are inserted in the channels. The justifying spaces are all of the same width and of maximum size, and when the words and spaces for a line are all within the several holders, the combined length of the type and spaces is greater than the length of a line so that if assembled into a line the line would be "overset". A dial upon the machine indicates when the type and spaces in the holders are sufficient for a line, and the operation of a line lever then causes a measuring device to adjust a trimming mechanism according to the number of justifying spaces in the holders for a line and the oversetting of the line. The holders pass this trimming device in succession and the spaces are trimmed, while in the holders, to the proper width to justify the line. The type and justifying spaces, after passing the trimmer, are ejected from the rear ends of the holders into a galley where the line is assembled. Thus, instead of assembling the type in a line and then inserting spaces to justify the line, the type and the justifying spaces are placed in the word-holders and the spaces are trimmed while in the holders and before the line is assembled.

The mechanism for carrying out my invention is capable of certain modifications whereby, instead of inserting justifying spaces of maximum width in the word-holders when the type are being assembled therein and trimming these spaces to justify the line, spaces of the proper width to justify the line may be inserted in the holders, in succession, after the type for the words of a line have been inserted in the holders and before the line is assembled in the galley.

In the accompanying drawing which illustrates my invention, Figure 1 is a top plan view of a machine embodying my invention, the bracket which supports the upper end of the shaft of the measuring device being broken away; Fig. 1ª is a detail view of a device for tripping a holding pawl; Fig. 2 is a front elevation of the machine; Fig. 3 is a side elevation of the machine, looking from left to right in Fig. 1, the driving pulley and the supports for the word-carrier and for the upper end of the shaft of the measuring device or gage carrier being omitted; Fig. 3ª is a top plan view of the levers for moving the clutch member of the gage-carrier, parts being shown in section on the line 3ª—3ª of Fig. 3; Fig. 4 is a side elevation of the machine, looking from right to left in Fig. 1; Fig. 5 is a section taken about on the line 5—5 of Fig. 1;

Fig. 5ª is a detail of the clutch for connecting the mechanism to the driving shaft; Fig. 5ᵇ is a detail view of one of the detents for engaging the wedges on the measuring device; Fig. 6 is a vertical section through the center of the trimming device and a portion of the word carrier; Fig. 7 is a front elevation of one of the word-holders; Fig. 7ª is a side view, on an enlarged scale, of one of the types; Fig. 7ᵇ is a perspective view, on an enlarged scale, of one of the spaces; Fig. 7ᶜ is a horizontal section, on an enlarged scale, through one of the word-holders, on the line 7—7 of Fig.7; Fig. 8 is a top plan view of the trimming device and one of the word-holders; Fig. 9 is a section through the gage carrier, cutter frame and word carrier wheel on the line 9—9 of Fig. 5, partly broken away to show the ratchet wheels, and some of the parts being omitted; Fig. 10 is a perspective view of one of the wedges of the rotary measuring device; Fig. 11 is a detail view of one of the gage pins; Fig. 12 is a vertical section through the word carrier wheel taken on a line passing through two of the index pins; Fig. 13 is a top plan view of the gage carrier, cutter frame and word carrier wheel; Fig. 14 is a side elevation of the sleeve in which the gage pins and wedges are mounted; Fig. 15 is a top plan view of said sleeve; Figs. 16 to 20, inclusive, are sectional views taken through the sleeve on the driving shaft, showing the several cams connected thereto; Fig. 21 is an enlarged plan view of the line advancing mechanism; Fig. 22 is a section through the same on the line 22—22 of Fig. 21; and, Fig. 23 is a perspective view of a logotype which may be used in the machine.

Referring to the drawings, 1 indicates a suitable bed plate upon which the machine is mounted, and 2 indicates a driving shaft which is journaled in standards 3 and 4, secured to the bed plate. The shaft 2 extends through a sleeve 5 which sleeve has, secured to it, cam wheels 6, 7, 8, 9 and 10 for operating various parts of the mechanism. This sleeve is normally stationary, but it is clutched to the driving shaft and makes one revolution each time the operator moves either the justifying space-key or the line-lever, as hereinafter more fully described. For this purpose a spring clutch pin 11 is shown in the drawing, this pin being mounted in the cam wheel 6 and adapted to engage a recess 12 in a collar 13 upon the shaft. Normally the pin is held out of the recess by a tapering finger 14 which is secured to a rock shaft 15 in a suitable bearing 16. When the rock shaft 15 is moved in one direction the finger 14 is moved out from under the head of the clutch pin, allowing the latter to engage the collar 13 so as to connect the sleeve with the main shaft. After the finger 14 is returned to its normal position, the head of the clutch pin engages the tapering end of the finger and the pin is withdrawn from the recess in the collar 13, thereby disconnecting the sleeve 5 from the main shaft. Any suitable form of clutch may be used. The clutch here shown is of a type commonly used in wheel presses and other forms of machinery. The clutch finger is normally held in position to disengage the clutch pin from the collar 13 by a suitable spring 17. It may be moved from this position, to engage the sleeve with the main shaft, by a line lever 18 which is secured to a rock shaft 19, the latter having an arm 20 adapted to bear upon an arm 21 projecting from the shaft 15 which carries the finger 14. When the line-lever is depressed it will be seen that the finger will be withdrawn from engagement with the clutch-pin. The operator releases the line-lever as soon as it has been depressed, and a spring 22 returns the shaft 19 to its normal position and permits the clutch finger to move back to normal position. After the sleeve 5 has made one revolution the head of the clutch-pin rides out on the tapering finger and the pin is withdrawn from the recess in the collar on the shaft. A spring-pressed roller 250 enters a depression on a collar 251 on the sleeve 5 at the end of each revolution of the sleeve and prevents over-rotation of the sleeve. The clutch mechanism may also be operated, independently of the line-lever, by the justifying space-key (not shown in the drawings). The justifying space-key, when operated rocks a shaft 34, (Fig. 1) to which is attached an ejector 23 adapted to insert a justifying space into a word-holder, as hereinafter described. The ejector is secured to the shaft 34 by an arm 23ª and below this arm on the shaft 34, is secured another arm 23ᵇ having a depending portion 23ᶜ, which strikes a lever 24, secured to a shaft 25 which is mounted in suitable standards 26 and 27. Arms 28 and 29 on the shafts 25 and 15, respectively, are connected by a link 30 so that when the shaft 25 is rocked by the engagement of the arm 23ᵇ with the lever 24, the shaft 15 will be rocked and the finger 14 will be moved to release the clutch-pin 11 and thus connect the sleeve 5 with the main shaft. When the justifying space ejector 23 and arm 23ᵇ return to normal position, shown in Fig. 1, the spring 17 moves the tapering finger 11 back to normal position and, through the connections described, returns the lever 24 to its normal position.

It is immaterial whether the type and justifying spaces, for use in the machine shown in the drawings, are taken from magazines, by suitable selecting mechanism, operated by keys, or whether they are molded by a suitable type casting machine, as required. If used in connection with a type casting machine, the die plate may be controlled directly by a key-board.

In the drawing, Figs. 1 and 3, 31 indicates, in outline, the die plate of a type casting machine and 32 indicates an ejector for ejecting the type and quad spaces from the mold of the casting machine. The justifying spaces are cast in a separate mold, indicated in outline at 33 and ejected therefrom by the ejector arm 23 mounted on the shaft 34, which shaft, it will be understood, is oscillated each time the justifying space key on the key board is operated. As the machine, which forms the subject of my invention, may be applied to various forms of type-casting or type-setting machines, the arrangement of the type channels and ejecting devices for delivering the type and spaces to my machine will vary according to the construction of the machine to which this invention is applied, and, therefore, the delivery channels and ejecting devices are merely outlined in the drawings, and, it will be understood, are only illustrative.

Figs. 7ª and 7ᵇ illustrate, respectively, the preferred form of type and justifying space used in the present machine. The type, t and also the quad spaces, are formed with notches 35 and 36 on opposite sides. The justifying spaces, s, are not notched. Each justifying space consists of a body portion 37, whose width is equal to, or slightly less than, the width of the smallest justifying space ordinarily used in a line of type, and two lateral projections 38 at the ends, the total width of the space, including the body and lateral projections being equal to the width of the largest justifying space ordinarily used in a line. The width of each type and space is preferably some multiple of a given unit.

*Word holders and carriers.*—The type and justifying spaces, when ejected from their respective molds, or selected from magazines, are delivered into a series of word-holders, which are brought successively in front of a common delivery channel 39. The type fit closely within the channels of the word-holders and are held upright by the frictional engagement of the sides of the type with the walls of the channels; but if desired auxiliary devices may be supplied for applying spring-pressure to the sides of the type to hold the type upright. These word-holders are mounted in a carrier wheel A, and are shown in detail in Figs. 6, 7, 7ᶜ, 8 and 13. Each word-holder has a type channel of sufficient length to receive the type for the longest word that is apt to be used and it is also provided with means for locking a justifying space in one end of the channel. There are more word-holders in the carrier wheel than there are words in the ordinary line, and in the drawing sixteen word-holders, a' to a¹⁶, inclusive, (Fig. 13) are shown. These word-holders fit into the same number of radial slots, 40, (Figs. 6 and 9) in the carrier A. Each word-holder, as shown, consists of a body a adapted to fit within a radial slot 40 in the carrier and having in its upper end a type channel 41 which is open at both ends so that the type can be inserted into the channel at one end and ejected from the other. The word-holders are adapted to slide vertically in the guide slots 40 and they are prevented from moving radially in the carrier wheel by shoulders 42, on the word-holders, which fit into corresponding recesses 43 in the guide slots. When the word-holders are in position in the carrier wheel the type channels 41 are radial to the axis of the wheel. At the outer end of each type channel is arranged a pair of spring detents 44 which project partly across the entrance to the channel and these detents are provided with beveled heads, as shown, so that the type and spaces when pressed into the channel will spread the detents apart. These detents prevent the type and spaces from falling out of the outer or receiving ends of the channels. Immediately in the rear of the heads of the detents, two pairs of stops 45 and 46, respectively, project into the channel. These stops are located so that they will be in line with the notches 35 and 36 in the type bodies and quad spaces, and the type and quad spaces may, therefore, pass into the type channels without being impeded in their movement; but as the bodies 37 of the justifying spaces are not notched, the stop will prevent the justifying spaces from passing inward beyond the stops. The distance between the stops and the heads of the detents is only great enough to permit the body of a justifying space to enter therebetween, and when a justifying space is moved into the entrance of a channel it immediately becomes locked in position so that it can neither pass further in nor fall out. The stops 45 and 46 are secured to spring-pressed arms 47 and 48, respectively, pivoted in recesses in the sides of the holder and parts 49 and 50, secured to said arms respectively, project upward and thence inward toward one another, above the type channel. As hereinafter explained, when the type are ejected from the rear or inner ends of the word-holders into the galley, a spreader enters between the parts 49 and 50 and spreads the arms 47 and 48, and the stops thereon, apart, so that the justifying space may be moved past the line of the stops and transferred with the type to the galley.

Each word-holder has on its forward or outer side a roller 51 which rests upon a circular cam track 52 in a stationary cylindrical support 53 which is mounted upon a standard or bracket 54. The carrier wheel A is secured to a vertical shaft 55 which is journaled in the bracket 54. The cam track 52, commencing a little to the left of the delivery channel 39 and continuing around to the right for a little more than half a circle, is level and of the proper height to bring the channels in the word-holders on a level with the channel 39, to receive the type. Commencing at points which are slightly to the left of a line passing through the axis of the carrier wheel and through the delivery channel 39, the track rises gradually, its highest point being 90 degrees to the left of the delivery point 39, looking from front to rear. The gallery G is arranged over the carrier wheel and extends rearwardly, as shown in Fig. 1. The rotation of the carrier wheel, in the direction of the arrow in Figs. 1 and 13, causes each word-holder, after passing the delivery point 39, where it receives its type, to travel around on the low portion of the cam track until it has passed under the gallery. After making a little more than a half revolution the word-holder is raised by the cam surface of the track, which is at the left of the galley, and when the word-holder has made three-quarters of a revolution it will rest upon the highest point of the cam and its channel will be in line with the channel in the galley, so that the type may be ejected from the word-holder into the galley. The word-holder, in completing the last quarter of its revolution, will descend on the cam to the low, level part of the track before it reaches the delivery point 39. As hereinafter explained the justifying spaces in the word-holders are trimmed to the proper width to justify the line during the third quarter of the revolution of the holders. A flange 56, on the support 53, overhangs the cam-portion of the track, forming a groove in which the rollers on the word-holders travel.

After the type for one word of a line have been inserted in a word-holder, the justifying space key is operated, unless this word is the last one in the line, and a justifying space is thereby carried by the ejector 23 into the channel of the word-holder where it becomes locked at the entrance of the channel with its ends projecting beyond the front face of the word-holder. The arm 23$^b$, striking the lever 24, causes the sleeve 5 to be clutched to the driving shaft, through the connections before described, and the word carrier then moves one sixteenth of a revolution to bring the next word-holder in the series in line with the delivery channel 39. When the type for the last word in the line have been inserted in a holder, as no justifying space is required after the last word, the justifying space key and the ejector 23 are not operated, but the line lever is operated and this causes the sleeve 5 to be clutched to the main shaft and the carrier to be rotated one-sixteenth of a revolution to bring the holder for the first word in the next line opposite the delivery point 39. This movement of the carrier A is accomplished by means of a ratchet wheel 57, (Figs. 2, 4 and 9) which is secured to the shaft of the carrier wheel and operated by a pawl 58 mounted upon an arm 59 secured to a collar 60 which turns on the hub 59$^a$ of the ratchet wheel. The collar 60 is oscillated by a link 61 pivotally connected to the arm 59 and to a lever 62 which carries a roller 63 arranged to bear upon the cam wheel 9 on the sleeve 5. The lever 62 is journaled upon a stud 64 which is secured to the upper end of a standard or bracket 65. A spring 66 holds the lever so that its roller 63 will constantly bear upon the cam wheel 9.

The ratchet wheel 57 has twice as many teeth as there are word holders in the carrier, and when the carrier has sixteen word-holders, as shown in the drawing, the ratchet wheel will have thirty-two teeth. The cam 9 (see Fig. 19) is so formed that each revolution of the cam will cause two back and forth movements of the lever 62 and consequently two movements of the pawl 58, so that the carrier, in traveling the distance between word-holders, that is, one-sixteenth of a revolution, will first move one-thirty-second of a revolution and then stop and then move another thirty-second of a revolution. While the carrier is stationary, between the two movements, the justifying space in one of the holders is trimmed by a pair of constantly driven cutters $c$ and $c'$ which engage the ends of the justifying space. These cutters, as shown in Figs. 5 and 6, are upon the ends of spindles 70 and 71 which are arranged radially to the axis of the carrier in a cutter slide $k$, movable in guide-ways 72, (Figs. 8 and 13).

The spindles are connected by intermeshing gears 73 of equal diameter and are driven by a belt applied to a pulley 74. A roller 75 is arranged at the rear of the slide upon a stud 76 which is threaded into a cross-head 77 movable in guide-ways in the cutter slide. An adjusting screw 78 journaled in a cross-piece 79 on the cutter slide, is threaded into the cross head 77 and adapted to adjust the latter and the roller 75 with respect to the slide. The adjusting screw has a scale 80 upon its head, as shown in Fig. 8, and a hand or pointer 81, fixed to the cross-piece 79, serves as a guide to the eye in setting the adjusting screw. A spring 82 holds the roller 75 on the cutter slide against gage pins $b'$, $b^2$, etc., (Figs. 1, 11 and 13), on a measuring mechanism B, which gage pins have inclined or cam surfaces for advancing the cutter slide toward the carrier A when the mechanism B is rotated as more fully explained hereinafter. Normally the cutters are held out of the paths of movement of the projecting ends of the justifying spaces by the spring 82, but they are advanced at the proper times, when the carrier A is stationary, to trim the ends of the spaces. The guides 72 for the cutter frame are integral with a bracket 83 which is secured to the cylindrical support 53. A dial D, suitably supported, (Figs. 2 and 4), operated by the letter and space keys, indicates to the operator when the type and spaces sufficient for a line are filled into a series of successive holders, and the operator then depresses the line lever 18 which, among other functions, causes a number of gage pins $b'$, $b^2$, etc., on the device B, to be positioned so as to adjust the cutters to the proper position to trim the justifying spaces in the word-holders to the proper width to justify the line. Then while the operator is causing the words and spaces for a succeeding line to be inserted in succeeding holders, the justifying spaces of the previous line are brought successively opposite the cutters and trimmed to the required width. This trimming operation on each justifying space occurs just before the word-holder reaches the highest point on the cam track 52 and while the carrier wheel A is stationary, after it has moved one thirty-second of a revolution and before it commences the next thirty-second of a revolution during the operation of the cam 9, this dwell in the movement of the carrier being for the purpose of allowing the cutters to act while the carrrier is stationary. After passing one-thirty-second of a revolution beyond the cutters the channel in each word-holder comes in line with the channel in the galley G and the type are then transferred from the holder through the rear or inner end of the channel into the galley by means of an ejector 90 (Figs. 1, 2 and 5), which is attached to a guide 91 movable in a guideway 92 parallel with the channel in the galley, said guide being pivotally connected to a lever 93 mounted upon a vertical shaft 94 which is journaled in a bracket 95. An arm 96 on the lower end of the shaft 94 has a roller which bears against the cam 8. A spring 97 holds the roller against the cam and also holds the ejector 90 normally out of the path of movement of the word-holders. A spreader 98 (Figs. 1, 2, 5 and 21), upon the ejector 90 enters between the upward projections 49 and 50 on the spring arms which carry the stops 45 and 46 and spreads the stops apart before the ejector 90 enters the channel in the word-holder or engages the justifying space at the entrance of the channel. The stops being moved out of the way, the ejector then transfers the justifying space, if there be one, and the type for the word from the holder into the galley.

It will be understood from the foregoing that the type for the several words of a line are inserted into separate holders, a justifying space of maximum size being inserted for each word except the last, and the carrier rotates step by step as the word-holders are filled. The dial indicates when the type for the words of a line have been placed in a series of holders, and it will be understood that the justifying spaces, being of maximum width, would overset the line if the words were assembled in a line without justifying the spaces. Gages on the rotary measuring device B, corresponding in number to the justifying spaces in the word-holders for the line, are positioned by the operation of the line lever so as to adjust the cutters to the proper position to trim the justifying spaces for the line, as the holders come successively opposite the cutters, and, after a word space in a given holder has been trimmed, the type and spaces in that holder are transferred to the galley.

In order to hold the spaces firmly against the stops 45 and 46, while being acted upon by the trimming device, a heavy spring arm 101 (Figs. 6 and 8) is arranged upon one of the guideways for the cutter and bears against the periphery of the carrier wheel and is adapted to press against the body of the justifying space and hold the same firmly against the stops 45 and 46 when the holder is directly opposite the cutters.

*Line advancing mechanism.*—When all of the type from the several holders for a line have been assembled in the galley, the justified line in the galley is advanced by mechanism operated by the cam and controlled by a series of index pins $e'$, $e^2$, etc., (Figs. 2, 9, 11 and 13), these pins being arranged in the carrier between successive holders. The index pins project radially from the carrier and each pin as shown in Fig. 12 is normally pressed outward by a spring 110. When forced inward against the action of said spring, a spring catch 111 engages a groove 112 and holds the pin in its inward position. Each time the ejector lever $23^b$ is operated by the justifying space key, said lever strikes the index pin at the left of the holder which is at that time in front of the type delivery channel 39, and the index pin is thereby driven inward and retained by a catch 111. It remains in this position until the carrier has nearly completed a revolution, when a cam 113 on an upright bar 114, secured to the support 53, engages a lip $111^a$ on the catch 111 and, as the carrier rotates further the cam 113 pulls the spring detent 111 out of the recess 112 in the index pin and allows the latter to spring out to its normal position before it again comes into position to be struck by the ejector lever $23^b$.

As the lever $23^b$ is operated each time a justifying space is inserted in a word-holder, one index pin will be driven inward from normal position for each word in the line except the last. The index pin to the left of the holder containing the type for the last word in the line will, therefore, not be driven inward, but will project beyond the other index pins. A tripping lever 115, (Figs. 1, 3, 4, 5 and 9), secured upon a shaft 116 at the rear of the carrier, extends forward to a point beneath the ejector 90, and has at its free end a cam surface 115ᵃ which is out of the path of movement of the index pins which are driven inward from their normal position, but is in the path of movement of pins projecting out to their normal positions. Therefore, as the index pin for the last word-holder of the line is the only one which is not driven inward by the lever 23ᵇ, all of the pins except this last one will pass by the end of the lever 115 without engaging it, and the last pin will engage the cam projection 115ᵃ and depress the free end of the lever, thereby rocking the shaft 116. This shaft is mounted in a bracket 117, projecting from the rear side of the support 53, and in an upward projection 4ᵃ of the standard 4. A latch-lever 118 (Figs. 1 and 4) is secured to the shaft 116 and extends downward to a point over a stop 119 upon a lever 120, which is pivoted at 121 in a rearward extension 4ᵇ of the bracket or standard 4. This lever 120 carries a roller 122 adapted to bear against the underside of the cam 10. The roller is, however, normally held out of engagement with the cam by the latch-lever 118 which engages the stop 119 and it is normally pressed toward the cam by a spring 123 connected to the extension 4ᵃ of the bracket 4 and to a vertical shaft or rod 124 which connects the free end of the lever 120 with a lever 125 upon a rock shaft 126 arranged in front of the galley in bearings 127 and 128 in a bracket 129 which is secured to the cylindrical support 53. The rock shaft 126 carries two arms 130 which project rearwardly therefrom and are connected to a vertically movable slide 131, on which is mounted a thin flat metal piece 131ᵃ of the width of the galley and which forms one side of the type channel in the galley. Two arms 132 extending downwardly from the rock shaft 126 enter a slot 133 in a slide or pusher 134 which, when the arms 132 are swung rearwardly advances the lines of type in the galley. When the rock shaft 126 is moved so as to cause the arms 130 to move upward, these arms lift the partition 131 and the arms 132 then cause the slide 134 to advance the line of type, this latter movement taking place after the partition has been raised, owing to the lost motion between the arms 132 and the sides of the slot 133. When the arms 130 are again rocked to the horizontal position the partition 131 moves downward into the galley and the slide 134 moves back, leaving a space or channel between the partition and the slide.

When the index pin adjacent to the holder for the type of the last word in the line engages the arm 115, which it does after the type for the last holder of the line have been transferred to the galley, the shaft 116 and latch-lever 118 are rocked, the latter moving away from the stop 119 and thereby allowing the roller on the lever 120 to engage the cam 10. The rotation of the cam then causes the lever 120 to move downward and then upward, thus, through the link 124 and lever 125, causing the arms 130 and 132 to move the partition 131 and slide 134 to advance the line and form a new type channel in the galley. A spring 135 connected between the pin 136 on the rock shaft 116 and the bracket 4 normally holds the lever 118 against a stop 137. When the arm 115 is depressed by an index pin on the carrier the latch-lever 118 moves away from said stop 137 and out of line with the stop 119, and when the index pin passes beyond the end of the arm 115, the spring 135 returns the latch-lever against the stop 137 and over the stop 119.

The pins which are driven inward from their normal positions during the operation of delivering the justifying spaces into the word holders, remain in their inward positions until they have made nearly one revolution when the cam 113 causes these pins to be released, so that all of the pins are in normal positions when they pass to the front or delivery point.

*Justifying mechanism.*—The mechanism for setting the cutters at the proper point to trim the justifying spaces for a line comprises a circular series of pins, $b'$, to $b^{16}$, inclusive, corresponding to the number of word holders in the carrier A, and means for moving a set of these pins corresponding to the number of justifying spaces in a line, radially outward from their normal positions a distance proportioned to the measurement of the line and the number of justifying spaces in the line, and means for moving the pins thus set out past the roller on the cutter slide so as to advance the cutters at the proper times to engage the justifying spaces in the several holders containing the justifying spaces for a line.

A shaft 140 is vertically arranged in a bearing 141 on the bed plate, and in a bearing 142 at the upper end of a standard 143. Upon the upper end of this shaft is secured a long sleeve 144, (Figs. 14 and 15) having sixteen radial grooves 145 within which are arranged a corresponding number of similarly constructed wedges $f$, one of which is shown separately in Fig. 10. Each wedge is composed of a flat bar having on its outer or front edge, near its central portion, an inclined face 146. Above and below this inclined face the rear and front edges are parallel. A little below the inclined face is a forward projection or tooth 147, and notches 148 and 149 are cut into the forward edge of the bar near its upper and lower ends, leaving teeth 150 and 151 at said ends, respectively. Rings 152 and 153, secured to the ribs of the sleeve 144, extend around the wedges, above and below the inclined faces thereof, and hold the wedges within the slots in the sleeve. The diameter of the sleeve 144 is greatest near the center, as shown at 144ª, and, before the slots are cut in the sleeve, cylindrical openings 157 are bored in this enlarged portion to provide bearings or guideways for the gage pins $b'$ to $b^{16}$, inclusive. Each opening 157 is bisected by one of the radial slots. Each gage pin as shown in Fig. 11, consists of a body 154 having at one end a fork 155 adapted to fit closely around the forward edge and sides of the inclined portion of a wedge, and a head 156 which is beveled or rounded off from the center toward both sides. Collars or caps 158 fit into the outer ends of the openings 157, as shown in Fig. 11, and springs 159 are interposed between the collars and the forked ends of the pins to hold the latter in engagement with the inclined faces of the wedges. The wedges are held in any position of adjustment by the spring pressed pins.

The shaft 140 is turned one-sixteenth of a revolution each time the sleeve 5 is clutched to the driving shaft, by means of the cam wheel 6 which actuates a lever 170 (Figs. 1 and 3). This lever has one end journaled upon a stud 171 which is secured in a standard 172 and the other end of the lever is connected to a link 173, the latter connecting the lever with an arm 174 (Figs. 5 and 9) on a collar 175 which is journaled on the hub of a ratchet wheel 176, said ratchet wheel being secured to the shaft 140. A pawl 177 on the arm 174 engages the teeth of the ratchet wheel. This ratchet wheel has one tooth for each gage pin in the structure, or sixteen in all, and, therefore, each time the cam wheel 6 makes one revolution the shaft 140 and the wedges and gage pins carried thereby are turned one-sixteenth of a revolution. The shaft 140 and gage pins turn in the opposite direction from the direction of rotation of the word carrier, as shown by the arrows in Figs. 1 and 13.

Normally the wedges $f$ are in their uppermost positions in the slots 145, their upper ends being adjacent to the bearing 142. If any wedge is pulled downward, it is automatically returned to its upper position by a stationary cam surface 178, (Figs. 2 and 9), projecting from the bracket 83, as the shaft revolves. This stationary cam is engaged by the lower surface of the teeth 147 on the wedges, and is located so that it will raise the wedges after the gage pins connected therewith have passed by the roller on the cutter slide and before the wedges reach the front of the machine, so that each wedge when it comes directly to the front of the shaft 140 is in its uppermost position. It will be evident that when a wedge is pulled downward from its normal position, the gage pin operated thereby will be forced radially outward by the inclined face 146 of the wedge, and when the wedge is moved upward the gage pin will be returned to its normal position by its spring.

Each time the sleeve 5 carrying the cam wheels, is clutched to the main shaft the cam wheel 7 operates a bell crank lever 179 (Figs. 1, 2, 3, 4 and 5) pivoted on the stud 171, said lever comprising an arm 179ª which engages the cam wheel and an arm 179ᵇ which projects horizontally forward and has pivotally connected to its forward end, a finger 180, (Figs. 2, 3 and 9). This finger extends in front of the series of wedges and is adapted to engage the upper side of the tooth 147 of the wedge which may be at that time immediately at the left of the front of the shaft 140, as shown in Fig. 9. A spring 181 holds the finger in position to engage the tooth of the wedge.

Each time the justifying space key is operated and the sleeve 50 thereby clutched to the main shaft, the bell crank lever 179 is reciprocated and the finger 180 engages the tooth 147 of a wedge and moves the wedge down a short fixed distance. If there are, say ten words in the line, the justifying space key will be operated nine times, nine justifying spaces will be inserted in successive word-holders, and nine wedges $f$ will be moved down a short distance from their normal positions, in succession, by the finger 180. These selected wedges are afterwards pulled further downward, by the operation of the line lever, as will be hereinafter explained, so as to force the gage pins operated thereby radially outward to a distance controlled by the measurement of the type and spaces in the word holders and the number of justifying spaces in the holders for the line. It is necessary to select only as many wedges as there are justifying spaces in the line, and, therefore, as the sleeve 5 and cam wheels are set into operation by the movement of the line lever, instead of by the justifying space key, after the type for the last word in the line have been inserted in a holder, it is necessary to prevent the finger 180 from throwing down a wedge when the sleeve 5 is clutched to the main shaft by the operation of the line lever. This is accomplished by providing upon the finger 180 a shoulder 182 adapted to be engaged by a shoulder 183 upon a rod 184 which is pivotally connected to an arm 185 secured to the line rock shaft 19. The free end of the rod 184 slides in a suitable bearing 186 in the bracket which supports the cutter slide. When the line lever is rocked to start the mechanism the arm 185 moves the rod 184 so that the shoulder 183 on the latter will engage the shoulder 182 on the finger 180 and thereby rock the free end of the finger forward, out of line with the tooth 147 on the wedge which may at that time be at the front of the machine. Therefore, while the bell crank 179 will be rocked when the line lever is depressed, the finger 180 will not throw down the wedge at that time opposite the finger, and this wedge will remain in normal position.

The selected wedges, that is, those which are acted upon by the finger 180, are moved downward by the finger until the notch 149 at the lower end of each wedge passes by a spring pawl 190. One spring pawl is provided for each wedge and the pawl is pressed toward the wedge by a spring 191 and is normally held out of engagement with the wedge by a detent 192 carried by a flat spring 193 and engaging a notch 190ª (Fig. 5ᵇ) in the upper side of the pawl. These pawls, springs and detents, are all mounted on a cylindrical clutch member 194 which is connected to the shaft 140 and adapted to slide vertically thereon. The clutch member is cup-shaped at its upper end, as shown, so that the wedges may be moved downward into it, and the pawls project radially through the walls of the clutch member. The springs 191 are weaker than the springs 193. During the rotation of the wedges and said clutch member, as the springs 193 approach the front of the machine, they are raised in succession by a stationary cam 195, secured to the cutter frame. This causes the detents 192 to be released from the notches in the pawls 190 as the latter approach the front of the machine and each pawl when released is carried by its spring 191 into position to be engaged by the wedge when the latter is thrown down by the operation of the finger 180. When the wedge is thrown down, by the finger 180, the tooth 151 at the lower end of the wedge passes the pawl, and the latter enters the notch 149 above said tooth. Then, when wedges corresponding in number to the justifying spaces for a line are moved downward each of these selected wedges will be caught by a spring pawl 190 in the clutch member 194 and when said clutch member is moved still further downward, as hereinafter explained, the selected wedges will move with said member. When said member is released a spring 200 moves it upward on the shaft 140 and, as the wedges are firmly held by the springs 159, the pawls 190 ride out of the notches 149, without moving the wedges upward. When the pawls move out of the notches, they are caught by the detents 192 which enter the notches in the pawls. These notches, 190ª (Fig. 5ᵇ) in the pawls, have oppositely inclined sides so that when the detents enter them they will move the pawls slightly away from the wedges against the action of the springs 191.

The clutch member 194 is moved downward a distance controlled by the length of the line and the number of justifying spaces in the line, when the line lever is depressed, by the following mechanism: The clutch member 194 has a collar 201 which is engaged by a forked lever 202 having a central bearing 203. One end of this lever is pivoted to one end of a lever 204, the latter being mounted upon a movable fulcrum pin 205. This fulcrum pin extends through a block 206 which slides in a longitudinal slot 207 in the lever 204. The pin 205 is carried by a slide 208 movable in horizontal guideways 209 in a suitable support or standard 210. A link 211 connects the slide 208 with a lever 212, also pivoted on the support 210 and having at its free end a roller 213 which is adapted to bear against a cam surface 214 at the lower end of a vertical rod 215. This rod has at its upper end two racks 216 and 217 the former adapted to be engaged by a moving pawl 218 and the latter adapted to be engaged by a holding pawl 219. A bracket 220 projecting from the standard 143 supports the pawls and forms a guiding means for the upper end of the rod 215. The lower end of the rod moves in a guide 221. The moving pawl 218 is centrally pivoted and its end portion 218ª tapers, as shown. The pointed end 218ª of the pawl is normally in line with the notches 148 in the wedges $f$ when the latter are in their uppermost or normal positions. When any wedge is moved downward by the finger 180, the tooth 150 on the wedge will engage the end 218ª of the pawl and rock said end downward causing the opposite end of the pawl to move the rod 215 upward one notch, where it is held by the holding pawl 219. When the wedges rotate one step without having a wedge thrown downward by the finger 180, as for instance, when the cam wheels are started into operation by the movement of the line lever, the notch 148 in the front wedge will allow the wedge to pass the pawl without interference. As one wedge is selected or thrown down for each justifying space inserted in the word-holders for a line, the rod 215 will be moved upward by the pawl 218 one notch for each justifying space in the line and this will cause the cam 214 at the bottom of said rod to actuate the lever 212 and thereby cause the movement of the slide 208 and the fulcrum pin 205 rearwardly or to the left in Fig. 3. The form of the cam 214 is such that when the rod 215 is moved upward the first step or notch, the fulcrum pin 205 will be moved a considerable distance to the left in Fig. 3 from its normal position, and for the successive upward steps or movements of the rod the fulcrum pin will be moved successively shorter distances to the left, the arrangement being such that for any given movement of the outer or forward end of the lever 204, the movement of the inner or rearward end will be in inverse proportion to the number of steps which the rod 215 has moved upward, or, in other words, to the number of wedges selected on the measuring device and the number of justifying spaces in the word-holders for a line. The position of the fulcrum 205 will therefore, depend upon the number of the justifying spaces in the line.

One end of the lever 204 is connected to a short rod 225 which latter is connected to one arm of a toggle lever 226 and slides in an opening in a suitable support 206ª. The other arm of the toggle lever is connected to a head 227 having guide pins 228 which slide vertically in guideways in a support 229 upon which the dial D is mounted. Between the guide pins 228, moving in a horizontal guide slot 230 in said support, is a wedge 231 having an upward projection 231ª arranged in the path of movement of an arm or lever 232 pivotally mounted at the center of the dial D, said lever having an arm 232ª adapted to be engaged by the pointer 233 on the dial after the latter has moved over the scale to the point which would indicate a full line. That is, the pointer on the dial does not move the arm 232ª and lever 232 until after the line is full and a further movement of the dial indicates the over setting of a line and causes the movement of the wedge 231 to an amount proportioned to the oversetting of a line.

When the line lever is rocked, an arm 233 secured to said lever and connected by a link 234 to the center of the toggle lever straightens the toggle lever. The head 227 on the toggle lever then bears against the lower inclined face of the wedge 231 and the outer end of the lever 204 is depressed a distance proportioned to the oversetting of the line, or, what is the same thing, to the total length of the line inclusive of the justifying spaces. As the fulcrum pin 205 is set according to the number of justifying spaces, the clutch member 194 will be moved downward by the centrally pivoted lever 202, connected to the lever 204, a distance which is controlled by the line measurement and the number of justifying spaces in the line. The selected wedges f will move downward with the clutch member and the gage-pins b operated by said wedges will be moved radially outward to a proportionate distance. These gage-pins will, as they pass the roller on the cutter-slide, move the cutters so as to trim off the proper amount from the justifying spaces to justify the line.

A rod 235 is arranged above the rear end 219ª of the holding pawl 219 and this rod carries a loosely suspended pawl 236 (Figs. 1 and 1ª) which may ride over the end 219ª of the pawl 219 when the rod 235 is moved in one direction, but which will engage said pawl 219 when the rod is moved in the opposite direction and thereby trip the holding pawl 219 and allow the vertical rod 215 to drop or be pulled down by a spring 222 to its normal position. A pin 237 limits the movement of the pawl 236 in one direction while said pawl is free to move in the opposite direction. When the line lever is depressed the toggle lever 226 is straightened and the clutch member 194, with the selected wedges, is moved, and at the same time the rod 235 above the holding pawl 219 is moved by an arm 238 on the rock shaft 19 in the direction to carry the pawl 236 past the pawl 219 so that the latter pawl is not tripped while the line lever is being depressed, and while the clutch member and wedges are being moved downward. When the line lever is released, however, the arm 238 moves the rod 235 backward and the pawl on said rod engages and trips the pawl 219 allowing the rod 215 to drop downward until the stop 240 on the upper end of said rod, engages the sleeve in which the rod slides and limits its downward movement. When the line lever is released, and after the rod 215 has dropped to its normal position a spring 241 rocks the lever 212 and causes the fulcrum pin 205 to move to the right, in Fig. 3, to its normal position. When the line lever is released, the toggle lever is flexed and the spring 200 moves the clutch member 194 upward into its normal position, the pawls 190 riding out of the lower notches in the wedges, which have been pulled downward, leaving said wedges in the positions to which they were moved by the clutch member, and in which positions they remain until the gage-pins operated thereby have passed the cutter slide, when they are raised in succession to their normal positions by the stationary cam 178.

Each time the line lever is depressed and released it performs the following functions: It causes the toggle lever to be straightened so as to draw the clutch member and wedges f downward, it throws the finger 180 out of action so that said finger will not depress a wedge, it causes the sleeve 5, carrying the cam wheels, to be connected to the driving shaft, and it causes the rod 235 to trip the holding pawl for the rod 215 after the clutch member has been moved downward with the selected wedges.

The order of operation of the cam wheels may be differently arranged, but in the machine shown in the drawing the operation is as follows: While the type for a word are being inserted in a word-holder, the cam wheels remain stationary and the dial hand moves a distance proportioned to the width of the type bodies, and after the type for any word in the line except the last has been inserted in a holder, the space key is struck and a justifying space is delivered into the entrance of the type channel in the holder and is there locked in position. The arm 23ᵇ, which moves with the justifying space ejector, drives an index pin e inward from its normal position and strikes the lever 24 and thereby rocks the shaft 25 which, through the medium of the link 30, swings the clutch finger 14 so as to release the clutch pin 11 and thereby causes the sleeve 5 to be connected to the driving shaft. The clutch finger then swings back into position to throw out the clutch pin after the sleeve has made one revolution. The cam wheels 6 to 10, inclusive, being all rigidly connected to the sleeve, rotate therewith. Cam 7 comes into action before the other cams and operates the bell crank lever 179 so as to cause the finger 180 to move one wedge on the device B downward a fixed distance. Cam 9 then moves the lever 62 and link 61 rearward to operate the ratchet for the word carrier, causing the word carrier to move one-half the distance between the centers of word-holders, or a thirty-second of a revolution, and the carrier then rests with the channel of one of the word-holders directly in line with the cutters. Cam 6 then operates the lever 170 and link 173 to turn the ratchet wheel 176 and the mechanism on the shaft 140, one step, or a sixteenth of a revolution, which causes one of the gages for a previously set up line to pass by the roller on the cutter slide and advance the cutters to trim the justifying space in the word-holder which is at that moment stationary opposite the cutters and contains the type for a word of a previously set up line. The cutters are constantly driven and owing to the form of the heads of the gage-pins, the slide is advanced and then recedes while each gage-pin is passing the roller on the cutter frame. This movement of the gage-pin past the roller on the cutter frame takes place while the word carrier A is stationary, and as soon as the cutter frame has moved back to normal position the word carrier A is moved another thirty-second of a revolution by the cam 9 and comes to rest with the word holder containing the trimmed space directly in line with the channel in the galley. At this time another word holder will be in position to receive type from the delivery channel 39, and the operator may at this time resume the operation of the keys for delivering type into the latter word holder. After the carrier arrives at the last mentioned position the cam 8 operates the arms 96 and 93 and causes the ejector 90 to transfer the type from the word holder which is then opposite the galley into the galley. These operations are repeated each time the type for a word and a justifying space are inserted in a word-holder. It will be understood that when the type for one line are being inserted into successive holders, it is the spaces and type for the previous line that are being justified and transferred to the galley. The cam 10 rotates with the other cam wheels but performs no function except when the holder containing the last word for a line nears the point where the channel in said holder would be in line with the channel in the galley. At this point as the index pin adjacent to the holder was not driven inward by the space ejector lever $23^b$, this index pin trips the arm 115 thereby causing the latch lever 118 to move away from the stop 119 and permit the lever 120 to be operated by the cam 10. After the ejector 90, operated by the cam 8, has moved the type for this last word of the line into the galley, the cam 10 actuates the line advancing mechanism and moves the line forward in the galley. When the dial indicates to the operator that the holders contain more than enough to fill the line, he presses the line lever downward and this sets the cam wheels in action but causes the rod 184 to move the finger 180 out of line with the tooth 147 on the front wedge before the cam wheel 7 rocks the elbow lever 179 upon which said finger is mounted, so that when the line lever is depressed no wedge is thrown downward. The depression of the line lever also moves all of the selected wedges for a line so as to force the corresponding series of gage-pins outward into position to properly set the cutters for justifying that line and on the return movement of the line lever the holding pawl for the rod 215 is tripped allowing the latter to return to normal position.

In Fig. 13 the holders $a^8$ to $a^{13}$, inclusive, contain the type for one line, each holder, except the holder $a^8$, containing also a justifying space $s$. The holder $a^8$ contains the type for the last word in a line and, therefore, does not contain a justifying space, and the adjacent index pin $e^8$ is in its outer or normal position so that it will trip the line advancing mechanism, while index pins $e^9$ to $e^{13}$ are driven inward so that they will not trip the line advancing mechanism. The gage-pins for adjusting the cutter to trim the spaces in the holders $a^9$ to $a^{13}$, inclusive, are indicated at $b^9$ to $b^{13}$, inclusive. These gage-pins are set out from their normal positions while the gage-pin $b^8$ is in its normal position. The gage-pin $b^{13}$ and the holder $a^{13}$ have passed by the center line of the cutters and the space in the holder $a^{13}$ has been trimmed. This holder is in position to have its type and space transferred to the galley. The gage-pin $b^{12}$ is in position to advance the cutters into engagement with the space in the holder $a^{12}$ when the word carrier and gage carrier are advanced. When the word carrier advances a half step, or one thirty-second of a revolution, the space in the holder $a^{12}$ will stop opposite the cutters and the gage carrier will then advance one full step and move the gage-pin $b^{12}$ past the center line of the cutter so as to advance the cutter into position to trim the space in the holder $a^{12}$. In the same way the holders $a^{11}$ and $a^{10}$ and $a^9$ will come opposite the cutters and the gage-pins $b^{11}$, $b^{10}$ and $b^9$ will advance the cutters to trim the spaces in said holders respectively. When the gage-pin $b^9$ has passed the cutters the roller on the cutter frame drops back against the gage-pin $b^8$ and when the gage-pin $b^8$ passes the roller the holder $a^8$ will be opposite the cutters; but as the holder $a^8$ does not contain a space there is no need of advancing the cutters and as the gage-pin $b^8$ is in normal position the cutters will be at some distance from the front of the holder $a^8$ when the gage-pin $b^8$ passes the roller on the cutters. The type from each holder are transferred to the galley when the holder reaches the position of the holder $a^{13}$, and after the type have been transferred from the last holder, $a^8$, in the line, the gage-pin $e^8$ trips the line advancing mechanism.

The holder $a^7$ contains the type for the first word of the next line and the holder $a^3$ contains the type for the last word of the line. The holders $a^4$ to $a^7$, inclusive, contain justifying spaces and the cutters are advanced to trim these spaces by the gage-pins $b^4$ to $b^7$, inclusive. The gage-pin $b^3$, which remains in normal position, passes the roller on the cutters when the holder $a^3$, which does not contain a justifying space, is opposite the cutters. The index pin $e^3$ starts the line advancing mechanism after the type from the holders $a^3$ to $a^7$, inclusive, have been transferred to the galley. The holder $a^2$ contains the type for the first word of the next line and the holder $a'$ is at the point where it receives type. The holders $a^{14}$, $a^{15}$ and $a^{16}$ are shown without type, these holders having passed the point where the type are transferred to the galley. The holder $a^{14}$ contained the type for the last word of a line and the index pin $e^{14}$ controlled the line advancing mechanism for that line. The index pins $e^{15}$ and $e^{16}$ are in their inner positions but the index pin $e'$ having passed the cam 113 (Fig. 12) has been released and is in position to be struck and driven inward when the justifying space is inserted in the holder $a'$. The gage-pin for the holders $a^{14}$ to $a^{16}$, inclusive, are indicated at $b^{14}$ to $b^{16}$, inclusive.

The gage-pins and the wedges with which they co-act form gages for effecting the adjustment of the space-regulating device. It is obvious that the members referred to as gage-pins may have various forms, and that, with slight change in the forms of the wedges, the inclined faces of the latter might be used as the bearing surfaces for the rollers on the cutter-slide and the gage-pins dispensed with, the gages then consisting merely of the wedges.

In order to prevent chippings from the cutter from getting among the type, a blower may be provided for blowing the chippings downward.

Instead of inserting justifying spaces of maximum width in the word-holders and then adjusting a trimming device to trim these spaces, I may use the same measuring mechanism to adjust a space mold so as to cast spaces of the size required to justify the lines, and dispense with the trimming device, an ejector, in such case being arranged to transfer the spaces one at a time, into the word holders as they are cast and just before the type are transferred from the holders to the galley; or a suitable space cutting or swaging device may be set by the measuring mechanism to cut or swage spaces of the proper width to justify the line, a suitable ejector being arranged to transfer the cut or swaged spaces into the word holders before the type are transferred to the galley. The mechanism may also be used in connection with machines for casting entire words or logotypes, such as illustrated in Fig. 23. In such case, the logotype would be made with grooves, as shown, and the justifying spaces would be inserted separately after the logotypes were in the word-holders, the justifying spaces being either trimmed or cast to size.

If, in the operation of the machine it happens that the last word for a line is a one-syllable word so long that it cannot be put in the line and the justifying spaces would not fill out the line if the word were left out, the operator, if aware of this before the line is set, will cast or select quad spaces of sufficient width to fill the line. If the operator does not find that the line will be underset until the last word is reached, he will then cast the quad spaces required, as indicated by the dial, and insert by hand the last letters of the words and the justifying spaces.

What I claim is:—

1. In a mechanism for composing justified lines of type, the combination with a series of word holders adapted to hold the type and justifying spaces for a line, of means for reducing the width of said spaces while in the holders to justify the line.

2. In a mechanism for composing justified lines of type, the combination with a series of word-holders adapted to hold the type and justifying spaces for a line, of a device adapted to trim said spaces while in the holders, and means for bringing said holders successively opposite said device.

3. In a mechanism for composing justified lines of type, the combination with a series of word-holders adapted to hold the type and justifying spaces for a line, of a space trimming device adapted to trim said spaces while in the holders, means for moving said holders relative to said device, and means for adjusting the position of said device according to the line measurement and the number of justifying spaces in the line.

4. In a machine for composing justified lines of type, a series of word-holders, each holder having a type channel, means for inserting type and justifying spaces in the channels of said holders, means for trimming said spaces while in the holders to justify the line, and means for ejecting the type and spaces from said holders after the spaces have been trimmed.

5. In a machine for composing justified lines of type, a rotary word carrier, a series of independently movable word-holders rotatable therewith, each holder having a type channel, means for inserting type and justifying spaces in the channels of said holders, means for trimming said spaces while in the holders to justify the line, and means for ejecting the type and spaces from said holders after the spaces have been trimmed.

6. In a mechanism for composing justified lines of type, the combination with a series of word-holders and means for removing the same step by step, of means for inserting the type for one word of a line in successive holders, means for inserting justifying spaces of maximum width in said holders and means for trimming the spaces while in the holders to the proper width to justify the line.

7. In a mechanism for composing justified lines of type, the combination with a series of word-holders and means for moving the same step by step, of means for inserting the type for one word of a line in successive holders, means for inserting justifying spaces of maximum width in said holders, means for trimming the spaces while in the holders to the proper width to justify the line, and means for transferring the type and trimmed spaces from the holders to a galley.

8. In a machine for composing justified lines of type, a galley, a series of word-holders and means for moving them successively to the galley, each word-holder having a type channel therein and having means for holding a justifying space at the entrance of the channel, means for trimming said spaces while in the word-holders to justify the line, and means for releasing the spaces and for transferring the type and spaces from the several channels successively to the galley.

9. In a machine for composing justified lines of type, a galley, a series of word-holders and means for moving them successively to the galley, each holder having a type-channel extending through it and having means for holding a justifying space at the entrance of the channel, means for delivering type and justifying spaces into one end of each channel and means for releasing the justifying spaces and for ejecting the type and spaces from the opposite ends of the channels into the galley.

10. In a machine for composing justified lines of type, a galley, a series of word-holders and means for moving them successively to the galley, each holder having a type-channel extending through it and having means for holding a justifying space at the entrance of the channel, means for delivering type and justifying spaces into one end of each channel, means for trimming said spaces while in the holders to justify the line and means for releasing the justifying spaces and for ejecting the type and spaces from the opposite ends of the channels into the galley.

11. In a machine for composing justified lines of type, a rotary word carrier, a series of independently movable word-holders rotatable therewith, each holder having a type channel extending therethrough, means for inserting type and justifying spaces into each of said channels through one end thereof and means for ejecting the type and spaces from said channels through their opposite ends.

12. In a machine for composing justified lines of type, a rotary word carrier, a series of independently movable word-holders rotatable therewith, each holder having a type channel extending therethrough, means for inserting type and justifying spaces into each of said channels, through one end thereof, means for trimming said spaces while in the holders to justify the line, and means for ejecting the type and spaces from said channels through their opposite ends.

13. In a machine for composing justified lines of type, a rotary word carrier, a series of word-holders movable with the carrier and having radially arranged type channels, means for inserting type and spaces into said channels through their outer ends, and means for ejecting the type and spaces from the inner ends of the channels in succession.

14. In a machine for composing justified lines of type, a rotary word carrier and means for turning the same step by step, a series of word-holders movable with the carrier and having radially arranged type channels, means for inserting type and spaces into said channels through their outer ends, and means for ejecting the type and spaces from the inner ends of the channels in succession.

15. In a machine for composing justified lines of type, a word-holder having a type channel therein and one or more movable stops near the entrance to said channel adapted to engage a justifying space and prevent its passage through the channel.

16. In a machine for composing justified lines of type, a word-holder having a type-channel therein and having one or more movable stops extending into the channel near one end thereof, said stop or stops being adapted to engage a justifying space and prevent its passage through the channel, in combination with an ejector and means movable with the ejector for moving the stops out of the line of the channel.

17. In a machine for composing justified lines of type, a word-holder having a type channel therein, one or more stops near the entrance to said channel adapted to engage a justifying space and prevent its passage through the channel and one or more detents at the entrance of the channel for preventing the space from falling out of the channel.

18. In a machine for composing justified lines of type, a series of word-holders, each holder having a type-channel and having one or more movable stops projecting into its channel near one end thereof, means for moving said holders step by step, an ejector arranged to enter said channels in succession, while the holders are stationary, and means movable with the ejector for moving the stops out of the channels.

19. In a mechanism for composing justified lines of type, a series of word-holders each having a type-channel adapted to hold the type for one word of a line, means for moving said holders one step, equal to the distance between successive channels, each time either the line key or the justifying space-key is operated, an ejector for transferring the type from said holders to a galley, and means for operating said ejector while the holders are stationary.

20. In a machine for composing justified lines of type, a word carrier, a series of word-holders movable with the carrier, each holder having a type channel, mechanism for inserting type and justifying spaces into one end of each channel and means for ejecting the type and spaces from the opposite ends of the channels.

21. In a machine for composing justified lines of type, a galley, a series of word-holders each having a type channel extending through it, means for delivering type into each channel through one end thereof, means for moving said holders successively, step by step, to the galley, and means for ejecting the type through the opposite ends of the channels into the galley while the holders are stationary.

22. In a machine for composing justified lines of type, a galley, a series of word-holders each having a type channel extending through it, means for delivering type into each channel through one end thereof, means for delivering justifying spaces into the same ends of the channels, means for moving said holders, successively, step by step, to the galley, and means for ejecting the type and the spaces through the opposite ends of the channels into the galley while the holders are stationary.

23. In a machine for composing justified lines of type, a word-carrier wheel having a series of radial guide slots, word-holders movable vertically in said slots, each holder having a type channel, a galley arranged above the carrier and a cam arranged to elevate said word holders, as the wheel revolves, to bring the channels in the word-holders in line with the channel in the galley.

24. In a machine for composing justified lines of type, a galley, a word carrier wheel arranged below the plane of the galley, means for rotating said wheel step by step, a series of word-holders rotatable with the carrier and each having a channel for receiving the type and a justifying space, means, below the galley, for delivering type into the word-holders, means for raising said word-holders to bring the type channels therein even with the channel in the galley, and means for ejecting the type from the holders into the galley.

25. In a machine for composing justified lines of type, a rotary word carrier, a series of word-holders movable vertically relatively to the carrier and having type channels radial to the axis of the carrier, a galley arranged above the carrier, means, below the galley, for delivering type and justifying spaces into said channels through their outer ends, means for elevating said word holders to the level of the galley as the carrier revolves, and means for ejecting the type and the spaces through the inner ends of the holders into the galley.

26. In a machine for composing justified lines of type, a rotary word carrier, a series of word-holders movable vertically relatively to the carrier and having type channels radial to the axis of the carrier, a galley arranged above the carrier, means, below the galley, for delivering type and justifying spaces into said channels through their outer ends, means for elevating said word-holders to the level of the galley as the carrier revolves, means for trimming said spaces while in the holders, and means for ejecting the type and the spaces through the inner ends of the holders into the galley.

27. In a machine for composing justified lines of type, a galley, a series of word holders each adapted to hold the type for one word of a line and a justifying space, means for transferring the type and spaces from the holders to the galley, line advancing mechanism for the galley, a series of index devices, one for each holder, adapted to control the operation of the line advancing mechanism, and means for moving one of said index devices to inoperative position each time a justifying space is inserted in a word-holder.

28. In a machine for composing justified lines of type, a galley, line-advancing means for the galley, a rotary word-carrier and means for rotating the same step by step, a series of word-holders movable with the carrier, a series of index devices rotatable with the carrier adapted to control the line-advancing mechanism, and means for moving an index device into inoperative position each time a justifying space is inserted in a holder.

29. In a machine for composing justified lines of type, a galley, line-advancing means for the galley, a rotary word-carrier and means for rotating the same step by step, a series of word-holders movable with the carrier, a series of index devices rotatable with the carrier adapted to control the line-advancing mechanism, means for moving an index device into inoperative position each time a justifying space is inserted in a holder, and means for restoring each index device to normal position before it has made a complete revolution.

30. In a machine for composing justified lines of type, a galley, a carrier wheel, a series of word-holders radially arranged in said wheel and each adapted to receive the type for a word and a justifying space, means for transferring the type and spaces from the holders to the galley, line advancing mechanism, index pins arranged in the carrier adjacent to the several holders and adapted to control the operation of the line advancing mechanism and means for moving one of said index pins to inoperative position each time a justifying space is inserted in a holder.

31. In a machine for composing justified lines of type, the combination with a galley, and line-advancing mechanism therefor, of a rotary carrier having a series of word-holders and a corresponding series of spring pressed index devices adjacent to the holders and adapted to control the line-advancing mechanism, means for moving one of said pins into inoperative position each time a justifying space is inserted in a holder, means for holding each index device in its inoperative position while the carrier is making part of a revolution, and means for releasing each index device before the revolution of the carrier is completed.

32. In a machine for composing justified lines of type, a galley, a series of word-holders adapted to hold the type for one word of a line and a justifying space, means for transferring the type and spaces to the galley, line advancing mechanism for the galley, a driving shaft, means operated by the driving shaft, for actuating the line advancing mechanism, a latch for normally preventing said means from operating, a series of index devices, one for each holder, adapted to trip said latch, and means for moving one of said index devices to inoperative position each time a justifying space is inserted in a holder.

33. In a mechanism for composing justified lines of type, the combination with a device for regulating the width of the justifying spaces in a line, of a series of word-holders each adapted to receive the type for one word of a line and a justifying space, means for moving said holders in succession to said device and means for adjusting the position of said device according to the measurement of the line and the number of justifying spaces in the line.

34. In a mechanism for composing justified lines of type, the combination with a device for regulating the width of the justifying spaces in a line and means for adjusting the position of said device according to the measurement of the line and the number of justifying spaces for the line, of a series of word-holders each having a channel adapted to hold the type for one word of a line, said channels being equal distances apart, and means for giving said holders a uniform movement each time either the line key or the justifying space-key is operated, to bring said channels successively opposite said device.

35. In a mechanism for composing justified lines of type, the combination with a series of word-holders and means for moving the same step by step, of a series of gages, means for moving said gages step by step, means for adjusting the positions of said gages according to the line measurement and the number of spaces in the line and a device controlled by said gages for regulating the width of the justifying spaces.

36. In a mechanism for composing justified lines of type, the combination with a space trimming device, a series of word-holders adapted to hold the type and justifying spaces for a line, and means for moving said holders in succession to the trimming device, of means for adjusting the position of said trimming device to justify the line comprising a series of gages, one for each justifying space in the line, and means for adjusting the positions of said gages according to the measurement of the line and the number of justifying spaces in the line.

37. In a machine for composing justified lines of type, the combination with a series of word-holders and means for moving the same step by step, of a series of gages, means for adjusting said gages according to the line measurement and the number of spaces in the line and a trimming device controlled by said gages for regulating the width of the justifying spaces.

38. In a mechanism for composing justified lines of type, the combination with a series of word-holders and means for moving the same step by step, a series of gages, and means for moving said gages step by step, of means for adjusting said gages according to the line measurement and the number of justifying spaces in the line, and means controlled by said gages for regulating the width of the justifying spaces.

39. In a machine for composing justified lines of type, a word carrier and means for moving the same step by step, a series of word-holders in said carrier each holder adapted to hold the type for one word of a line and a justifying space, a trimming device adjacent to said carrier for trimming the spaces in the holders, and means for adjusting said trimming device comprising a series of gages, means for adjusting said gages according to the line measurement and the number of justifying spaces in a line, and means for moving said gages step by step.

40. In a machine for composing justified lines of type, a rotary word carrier, and means for moving the same step by step, a series of word-holders in said rotary carrier, each holder adapted to hold the type for one word of a line and a justifying space, a trimming device adjacent to said rotary carrier for trimming the spaces in the holders, and means for adjusting said trimming device comprising a circular series of gages, means for adjusting said gages according to the line measurement and the number of justifying spaces in a line, and means for moving said gages step by step.

41. In a machine for composing justified lines of type, the combination with a rotary word carrier, a series of word-holders therein, and a rotary gage carrier having a series of gages corresponding in number to the number of word-holders, of means for inserting the type and justifying spaces in said holders, means for moving the word and gage carriers one step for each justifying space inserted in a holder, and a device controlled by said gages for regulating the width of the justifying spaces in a line.

42. In a machine for composing justified lines of type, the combination with a series of word-holders adapted to receive the type for the words of a line and justifying spaces, of means for regulating the width of said spaces to justify the line comprising a series of wedges arranged around a common axis, means for selecting one wedge in the series for each justifying space in the line, a device for engaging the selected wedges, and means for moving said device a distance controlled by the length of the line and the number of justifying spaces in the line.

43. In a machine for composing justified lines of type, a series of wedges, means for moving the same step by step, means for selecting one wedge in the series for each justifying space in the line, means controlled by the line key for moving the selected wedges a distance proportioned to the line measurement and the number of justifying spaces in the line, and a device controlled by said wedges for regulating the width of the justifying spaces in the line.

44. In a machine for composing justified lines of type, a series of word-holders and means for moving the same step by step, a series of wedges and means for moving said wedges step by step, means for selecting one wedge in the series for each justifying space in the line, means for moving the selected wedges from normal positions a distance proportioned to the line measurement and the number of justifying spaces in the line, and a device controlled by said wedges for regulating the width of the justifying spaces in the line.

45. In a machine for composing justified lines of type, a circular series of wedges, means for rotating the same one step each time the justifying space key or the line key is operated, means for selecting one wedge in the series for each justifying space in the line, means controlled by the line key for moving the selected wedges a distance proportioned to the line measurement and the number of justifying spaces in the line, and a device controlled by said wedges for regulating the width of the justifying spaces in the line.

46. In a machine for composing justified lines of type a circular series of wedges, a member adapted to be engaged by said wedges, means for selecting one wedge of the series and for moving the same into engagement with said member each time the justifying space key is operated, means for moving said member and the selected wedges a distance proportioned to the measurement of the line and the numbers of justifying spaces in the line when the line key is operated, and a device adjustable by the selected wedges and adapted to regulate the width of the justifying spaces in the line.

47. In a machine for composing justified lines of type, a rotary wedge carrier, a series of wedges arranged therein, a clutch member rotatable with the carrier, means for rotating said carrier step by step, means for moving one wedge in the series into engagement with said clutch member each time the justifying space key is operated, means for moving the clutch member and the engaged wedges a distance proportioned to the line measurement and the number of justifying spaces in the line each time the line key is operated, and a device adjustable by said wedges for regulating the width of the justifying spaces.

48. In a machine for composing justified lines of type, a shaft having a circular series of wedges mounted thereon, said wedges being movable lengthwise of the shaft, a clutch collar mounted upon said shaft and movable lengthwise thereon, means controlled by the justifying space key for moving successive wedges into engagement with said clutch collar, means for moving said clutch collar and the engaged wedges lengthwise of the shaft a distance proportioned to the line measurement and the number of justifying spaces in the line and means for rotating said shaft one step for each operation of the line key or the justifying space key.

49. In a machine for composing justified lines of type, a device for regulating the width of the justifying spaces, and means for adjusting said device comprising a circular series of wedges, means for selecting one wedge for each justifying space in the line and means for moving said selected wedges a distance proportioned to the line measurement and the number of justifying spaces in the line.

50. In a machine for composing justified lines of type, a device for regulating the width of the justifying spaces, and means for adjusting said device comprising a circular series of wedges, gage pins controlled by said wedges and adapted to engage said device, means for selecting one wedge for each justifying space in the line and means for moving said selected wedges a distance proportioned to the line measurement and the number of justifying spaces in the line.

51. In a machine for composing justified lines of type, a device for regulating the width of the justifying spaces, and means for adjusting said device comprising a circular series of wedges, means for rotating the same step by step, means for moving one wedge from normal position for each justifying space in the line, a cam movable one step for each wedge selected, a lever having a fulcrum adjustable by said cam, a clutch member movable by said lever and adapted to engage the selected wedges and means for moving one end of said lever a distance proportioned to the length of the line.

52. In a machine for composing justified lines of type, a cam bar having a toothed rack, a pawl for engaging said rack, a series of wedges each having a tooth for engaging said pawl, means for moving said wedges step by step past the pawl, means for moving one wedge into operative engagement with the pawl for each justifying space in the line, a lever having a fulcrum movable by said cam bar, a clutch member movable by said lever and adapted to engage the selected wedges, and means for moving one end of said lever a distance proportioned to the length of the line.

53. In a machine for composing justified lines of type, a series of wedges, means for selecting a number of said wedges corresponding to the number of justifying spaces in a line, and means for adjusting the selected wedges comprising a lever, means for adjusting the position of the fulcrum of said lever according to the number of wedges selected, and means for limiting the movement of said lever comprising a wedge, means for moving said latter wedge when the line is overset, and connections between said latter wedge and the lever for moving the lever when the line key is operated.

54. In a machine of the kind described, a rotary carrier, comprising a shaft having a sleeve thereon provided with radial slots, wedges in said slots, a clutch member movable lengthwise of the shaft and adapted to engage said wedges, a spring for holding said member in normal position, means for moving said member a distance proportioned to the line measurement and the number of justifying spaces in a line, and means for rotating said shaft one step each time the line or justifying space key is operated.

55. In a machine of the kind described, a rotary word carrier having word-holders therein, and a rotary gage carrier having gages therein, means for moving said carriers in opposite directions step by step, and a device adjustable by the gages in the gage carrier for regulating the width of the justifying spaces.

56. In a machine of the kind described, a rotary word carrier and a rotary gage carrier movable in opposite directions, and means for rotating said carriers one step each time the line key or justifying space key is operated.

57. In a machine of the kind described, a rotary word-carrier having word-holders therein, a rotary gage carrier, wedges on said gage-carrier, spring-pressed gage-pins, engaging said wedges, each gage-pin having a convex head, means for moving said carriers in opposite directions step by step, and a device movable by the heads of the gage-pins for regulating the width of the justifying spaces.

In testimony whereof I affix my signature, in presence of two witnesses.

WILLIAM T. HOOFNAGLE.

Witnesses:
F. LOWENSTEIN,
L. L. MAXFIELD.